FIG. 1

April 4, 1967  L. A. AMTSBERG  3,312,105
FIXED SPEED TORQUE TESTING APPARATUS FOR ROTARY AIR TOOLS
Filed Aug. 18, 1964  6 Sheets-Sheet 3

INVENTOR
LESTER A. AMTSBERG
BY
Stephen J. Rudy
ATTORNEY

April 4, 1967  L. A. AMTSBERG  3,312,105
FIXED SPEED TORQUE TESTING APPARATUS FOR ROTARY AIR TOOLS
Filed Aug. 18, 1964  6 Sheets-Sheet 4

INVENTOR
LESTER A. AMTSBERG
BY
Stephen J. Rudy
ATTORNEY

United States Patent Office 3,312,105
Patented Apr. 4, 1967

3,312,105
FIXED SPEED TORQUE TESTING APPARATUS
FOR ROTARY AIR TOOLS
Lester A. Amtsberg, Utica, N.Y., assignor to Chicago Pneumatic Tool Company, New York, N.Y., a corporation of New Jersey
Filed Aug. 18, 1964, Ser. No. 390,373
16 Claims. (Cl. 73—135)

This invention is directed to improved and novel apparatus for testing at a selected speed the torque delivery of rotary tools. The apparatus is designed particularly for use with rotary air tools, although it may well be subject to other applications.

Excessive friction in the motor, bearings or gears of an air tool, or excessive leakage of operating air to the motor result in subnormal torque output; and the general object of this invention is to provide apparatus for testing the tool to determine whether its torque output is deficient and consequently in need of repair.

The effect of excessive air leakage and friction is more prominent and more easily detected when the motor is loaded down to a relatively low speed. Accordingly, a further object of this invention is to provide torque testing apparatus which functions to load the tool down to a very low selected speed so that its torque delivery may be tested at that speed.

A feature of the invention is an improved torque testing device or dynamometer having an input spindle adapted to be drivingly coupled to the output spindle of a rotary air tool; and having automatically operable speed control means whereby the input spindle is prevented from exceeding a predetermined maximum speed and the output spindle of the tool is caused to be loaded down to the predetermined speed.

A further feature of the invention is a group of gear boxes of different gear ratios which may be selectively coupled to the input spindle of the dynamometer whereby various tools may be tested for their torque delivery at selected speeds other than the fixed speed of the dynamometer.

Accordingly, another object of this invention is to provide apparatus for testing the torque delivery of air tools at various selected speeds.

Another object of the invention is to provide a dynamometer which may be coupled directly with some tools and may be coupled indirectly through speed changing means, such as gear boxes, with other tools; and to provide a kit for this purpose.

A still further feature of the invention is an advantageous invertible gear box housing structure which enables the gear box to be removably clamped to a supporting bed and slidably adjusted thereon relative to the tool and dynamometer with which it is associated.

Another feature of the invention is advantageous means for rigidly holding a rotary power tool while it is being tested by the dynamometer for its torque delivery.

The foregoing and other objects and advantages of this invention will appear more fully hereinafter from a consideration of the detailed description which follows, taken together with the accompanying drawings wherein an embodiment of the invention is illustrated. It is to be expressly understood, however, that the drawings are for purposes of illustration and description, and they are not to be construed as defining the limits of the invention.

Reference is now directed to the several figures of the drawings wherein apparatus illustrating the invention is shown (FIGS. 1, 5) as comprising tool holding means 15 for rigidly securing in position for testing purposes a rotary air tool, such as the tool illustrated at 16; a dynamometer 17 for testing at a predetermined fixed speed the torque delivery of the tool; speed changing means 18 adapted to be coupled between the tool and the dynamometer for testing the torque delivery of tools at speeds other than that fixed for the dynamometer; rail bed means 19 for supporting the several members 15, 17 and 18; and a test data chart hereinafter set forth for facilitating the use of the apparatus by the operator.

Figure 3:
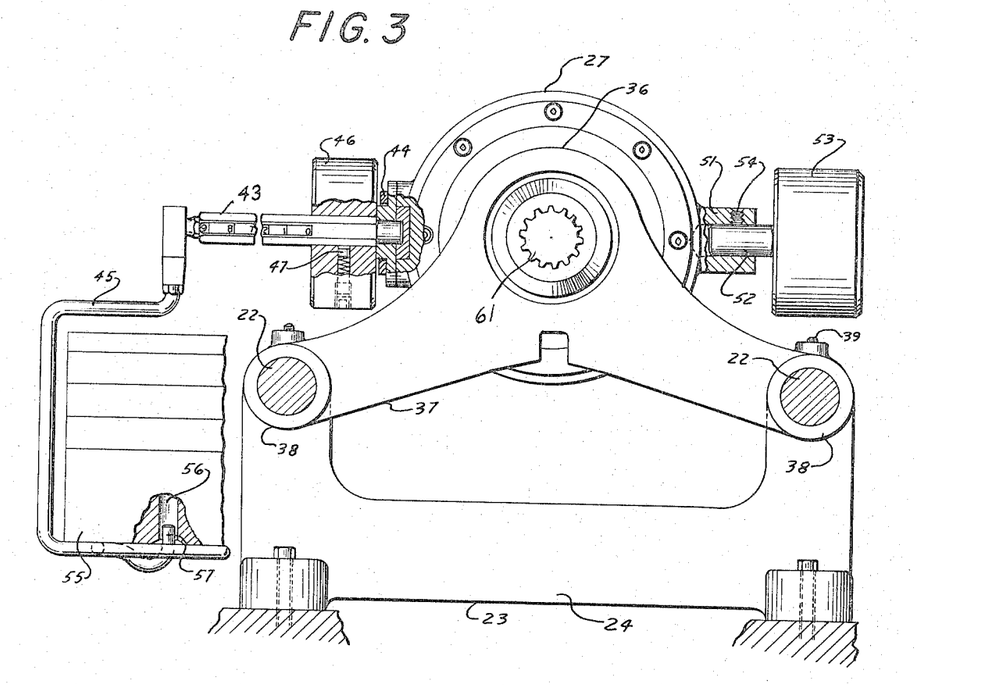
FIG. 3 is a right end view of the dynamometer shown in FIG. 1.

The supporting or rail bed means 19 (FIGS. 1, 3) for the apparatus comprises a pair of laterally spaced parallel cylindrical rods or rails 22 supported in horizontal level relation to each other by means of a pair of opposed upstanding brackets 23 rigidly anchored to a level surface. The main body 24 of each bracket extends below and transversely of the rods; it has as opposite upper ends a pair of sleeve portions 25. Each of the ends of the rods 22 is slidably received in a separate one of the sleeves, and is anchored against endwise movement by means of a set screw 26.

The dynamometer 17, which is best shown in FIGS. 1 to 4, is of an improved nature; and it represents a desired technical advance in the art of torque delivery testing devices. Its function is to automatically apply sufficient load to a drivingly connected tool to reduce the speed of the latter to a selected test speed and to indicate the torque output of the tool at that speed. It includes an elongated housing of general cylindrical design, designated as a whole by the numeral 27. The housing has an intermediate main section 28. At the right end of the latter is bolted a crowned section 29. At the left end of the intermediate section is an axial extension 31 of reduced diameter into which a coupling sleeve 32 is threaded in part. A long cylindrical cap 33 is threaded over a projecting end of this sleeve. A set screw 34 releasably locks the sleeve in position.

The housing 27 of the dynamometer is pivoted for limited angular rotation about a horizantol axis in a pair of bearings 35. Each of the bearings is mounted in a separate supporting bracket 36 having a body portion 37 which bridges over the bed rods 22. A sleeve formation 38 at each end of the body of the bracket slidably sleeves a separate one of the bed rods. Set screws 39 in the sleeve formations releasably anchor the brackets to the bed rods. A stop pin 41 (FIGS. 2, 4) projecting axially from the housing extends into a slot 42 formed centrally of one of the bearing brackets 36, and co-operates with the walls 58, 59 of the slot to limit the extent of angular movement of the housing in either direction. Here, the extent of such movement is about five degrees.

Extending radially from one side of the housing in extension of the lateral axis of the latter is a load arm 43. It has at it inner end a mounting plate 44 which is fixed to the side of the housing 27. A weight holder 45 is suspended from the outer end of the load arm 43. Here, the load arm is hexagonal in cross section; and it is scaled along one of its flats from 0–9. Each of the scale markings is indicative of a decimal fraction of pounds foot, a designation for torque value. A vernier weight 46 slidable along the load arm relative to the scale markings is frictionally held in any selected position by means of a spring loaded pin 47 frictionally engaging the load arm. The vernier weight has a normal position (FIG. 3) at the 0 mark, in which position it limits against the mounting plate 44. Extending from the other side of the housing, diametrically opposed to the load arm, is a boss 51 having an axial bore in which an axial stem 52 of a counterbalancing weight 53 is adjustably slidable. The latter weight serves to counterbalance the load arm 43 and the associated unloaded weight holder 45 when the vernier weight is at the 0 mark. A setscrew 54 fixes the adjusted position of the counterbalance.

Figure 4:
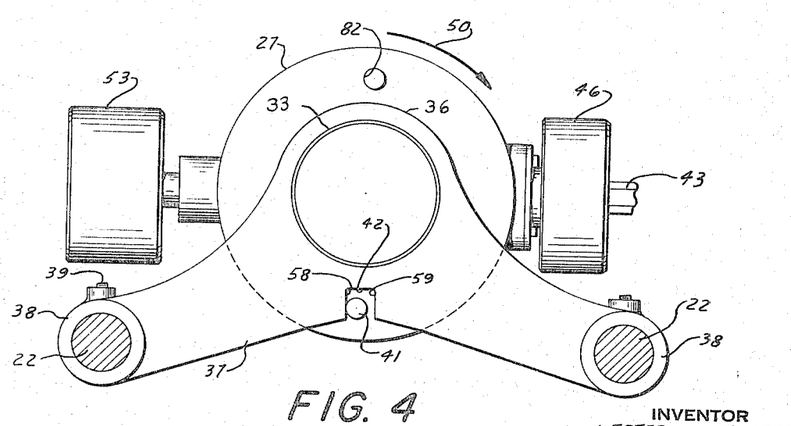
FIG. 4 is directed to the pin and slot arrangement, viewed from the left end of FIG. 1, which allows limited angular movement of the dynamometer member.

Various weights 55, each representing a specific number of pounds foot, may be selectively added to the weight holder. Each weight has an axial hole 56 for this purpose, whereby the weight is adapted to seat over an upstanding end 57 formed centrally of the bottom end of the weight holder 45. When the load arm is weighted (FIGS. 3, 4) either by movement of the vernier weight or the addition of weights to the holder, a corresponding torque force is exerted upon the housing 27 of the dynamometer causing it to urn on its axis for a limited degree in the direction of the arrow 50 (FIG. 4). The stop pin 41 (FIG. 4) determines the extent of this turning as it limits against the wall 58 of the slot 42. Rotation of the housing in the opposite or counter-clockwise direction (FIG. 4) is limited upon abutment of the stop pin against the other wall 59 of the slot. This limited counter-clockwise rotation of the housing will lift the load arm and cause the weights 55 to be elevated a short distance, here about seven-eighths of an inch.

The dynamometer includes an externally splined input spindle 61 which is adapted to be drivingly coupled (FIG. 1) to the output spindle 63 of the tool being tested. (It is to be remembered in reading the description of the dynamometer that only the upper half is shown in section in FIG. 2 since a section of the lower half would be the same.) The input spindle 61 (FIG. 2) is supported by means of a shank portion 64 for rotation in a broad bearing 65 fitted in the crowned section 29 of the housing. Within the housing the input spindle carries a pair of planetary idler gears 66 meshed between an internal gear 67 at the crowned section of the housing and a spur gear 68 formed upon an elongated brake shaft 69. The axes of rotation of the housing 27, the input spindle 61 and the brake shaft 69 coincide.

The brake shaft is supported for rotation relative to the housing in a pair of bearings 71, 72. Of these, the bearing 71 is seated in a recessed inner end of the input spindle 61; and the other bearing 72 is fitted in the intermediate housing section 28. Endwise movement of the brake shaft relative to the housing is restrained by these bearings. The brake shaft carries a centrifugally operated speed control governor generally designated 73. The governor cooperates with a normally relaxed slip clutch friction brake generally designated 74 arranged between the brake shaft 69 and the housing 27 to reduce to a predetermined fixed speed the speed of a test tool coupled to the input spindle.

The brake 74 is of the multi-disc friction type. It includes a group of friction discs 75 axially splined to a straight splined section 76 of the brake shaft for relative slidable movement. These discs are interleaved with a group of brake discs 77 which freely surround the brake shaft. The brake discs are splined to the housing by means of a pair of diametrically opposed pins 78 and 41. Each of the brake discs has a pair of diametrically opposed notches 79 in its periphery through each of which a separate one of the pins 78, 41 extends with a slide fit. Each pin is supported in part in a complementary bore 81 of the housing; and each pin is sufficiently elongated so that an end portion 82 thereof projects externally of the housing. This external end portion facilitates manipulation of the pin for its insertion or removal from the notches of the brake discs. The external end portion of the lower pin 41 cooperates with the slot 42 (FIG. 4) in limiting rotation of the housing, as earlier explained. The brake discs 77 are of greater diameter than the friction discs 75 so as to enable the notches 79 and pins 78, 41 to be located clear of the peripheries of the friction discs and thereby permit relative rotation of the friction and brake discs. By means of the action of the governor the several discs of the brake are compressible together between a rigid annular backing face 83 of the housing and a slidable annular pressure plate 84. The pressure plate has a splined connection with the straight splined portion 76 of the brake shaft for relative axial slidable movement.

The governor has a body 85 which is keyed at 86 for rotation with the brake shaft. Pivoted at 87 in each of a pair of diametrically opposed bifurcations 88 of this body member is a centrifugal flyweight 89 of rectangular form. The greater mass of the flyweight extends forwardly of its pivot and overlies a brake sleeve 91 which is slidable along the brake shaft. Each flyweight has a lug 92 at its rear which slidably depends into a separate one of a pair of diametrically opposed slots 93 formed at the rear of the brake sleeve. The brake sleeve is biased by means of a compression brake spring 94 in such manner that the forward walls 95 of the slots 93 press against the lugs so as to hold the flyweights pivoted to a position normally overlying the brake sleeve, as in FIG. 2. In this normal condition of the flyweights the brake sleeve abuts without pressure against the rear face of the pressure plate 84; and the several discs of the brake are in relative relaxed or uncompressed condition.

The brake spring 94 is confined between a pair of collars 96, 97 which are slidable along the brake shaft. The collar 96 at the left is biased by the spring against an adjustable locknut 98 threaded upon the end of the brake shaft. Under pressure of the spring the collar 97 at the right biases a collar pin 99 to the rear of a pair of diametrically opposed longitudinal slots 101 of the brake shaft. The collar pin extends transversely through the slots. Slidable rearwardly of the collar pin in an axial bore 102 of the brake shaft is a thick brake pin 103. A front end of the brake pin at all times abuts the collar pin 99; and a rear end of the brake pin at all times abuts a brake sleeve pin 104. The latter pin projects through a pair of diametrically opposed longitudinally extending slots 105 of the brake shaft. The projecting ends of the pin 104 abut against a recessed wall 106 at the front end of the brake sleeve. Under pressure of the spring the brake pin biases the brake sleeve to its normal relaxed position, as in FIG. 2.

When rotation of the brake shaft has attained full controlled speed, the governor flyweights 89 will be pivoted centrifugally outward so that their lug portions 92 force the brake sleeve 91 forwardly against the pressure plate 84 in opposition to the resistance of the spring 94 so as to compress the several discs of the brake into frictional engagement, whereby the drag or load of housing 27 is imposed upon the brake shaft. This drag acts through the brake shaft and gearing and thusly to the input spindle to limit the speed of the latter and that of the air tool coupled to the input spindle 61. It is understandable that the speed of the input spindle 61 at which the governor will cause a compressive action of the brake is dependent upon the resistance afforded by the spring 94. In this respect, tightening of the spring locknut 98 will increase the tension of the spring on the brake sleeve and thus allow an increase in speed at the input spindle; and loosening of the locknut will have the reverse effect. Precompression of the spring is made at the time of assembly of the apparatus so as to provide a fixed selected speed at the input spindle. Access to the locknut for this purpose, or for repairs when needed, may be had by removing the cylindrical end cap 33.

The planetary gearing, defined by the internal gear 67, the idler gear 66 and the spur gear 68, is of particular advantage. The ratio of the planetary gearing connecting the input spindle with the brake shaft is such that a multiplied speed is transmitted from the input spindle 61 to the brake shaft 69. This serves to amplify the torque of the brake; and it increases the speed of the centrifugal governor weights 89 so as to produce a relatively high force, most of which is expended in overcoming the resistance of the spring 94, and a relatively small percentage of which is expended in compressing the brake. Here, the force produced by the governor is about 400 lbs., only about ten percent of this force is required to compress the discs of the brake at maximum load, the remaining force being resisted by the spring. The reaction of the braking action of the brake upon the housing is transmitted back through the brake shaft and planetary gearing to reduce the speed of the input spindle and of the test tool coupled thereto to a relatively low test speed, here about 400 r.p.m., which maximum speed is maintained by the governor in the operation of the dynamometer.

It is understandable that the testing range of the dynamometer is limited, in that some tools have either insufficient or too much power at the test speed fixed for the dynamometer to effectively test it. Here, this testing range is preferably limited to tools having at the particular fixed speed (400 r.p.m.) of the dynamometer, a torque output range between two and twelve lbs.-ft.

As an example of the use of the dynamometer in testing the torque delivery of a rotary air tool, let it be assumed that a used tool known as having at the time of its manufacture a known torque delivery of 6 lbs.-ft. at a speed of 400 r.p.m. is to be tested. It is first drivingly coupled, as at 108 (FIG. 1), to the input spindle of the dynamometer. Next, an estimated weight load, which for convenience is taken as corresponding to six lbs.-ft., is added to the load arm 43. This will cause the dynamometer housing to rotate or pivot a few degrees clockwise (FIG. 4) until the stop pin 41 limits against the wall 58 of the slot 42. The tool is next pneumatically operated, and the rotation of the spindle 63 of the tool is then transmitted through the input spindle of the dynamometer and planetary gearing to the brake shaft 69. Whereupon, the governor is rapidly accelerated to compress the disc brake and thereby impose the drag of the dynamometer housing through the brake shaft and planetary gearing upon the input spindle. This limits the speed of the spindle and tool to the selected test speed of the dynamometer, here 400 r.p.m. If in this action the housing 27 fails to pivot counter-clockwise from the FIG. 4 position and elevate the weighted load arm 43, it is an indication that the output torque of the tool is insufficient to overcome the counter torque being exerted by the weighted load arm. Consequently, the tool would be in need of repair to determine the cause of its inadequate torque delivery.

The operator may determine the extent of this torque deficiency by decreasing as needed the weight load of the load arm until a balanced condition of the dynamometer is obtained wherein the counter torque applied by the weighted load arm to the housing substantially equals the torque being applied by the tool to the input spindle. In this balanced condition the housing will tend to oscillate on its axis raising and lowering the load arm a few degrees as it does so; and the stop pin will tend to float between the two walls 58 and 59 of the slot 42. This balanced condition of the torque forces is obtained as the governor cooperates with the brake in holding the input spindle to the fixed speed and preventing it from varying substantially therefrom. The adjusted weight of the load arm will indicate the torque delivery of the tool at the fixed speed. However, since the general object of the apparatus is to determine for purposes of repair whether the tool being tested does or does not meet the manufacturer's original known torque delivery of the tool at that speed, it is unnecessary for the operator to expend time in determining the extent of the deficiency. If the tool's test performance does not measure up to the manufacturer's original specification the operator will then mark the tool for repair operation. If on the other hand, during the testing operation, the housing should pivot counter-clockwise from the FIG. 4 position to lift the load arm and hold the stop pin 41 against the wall 59 of the slot, it is an indication that the torque being applied to the input spindle is greater than the counter torque being applied to the housing.

Figures 7, 8, 9:
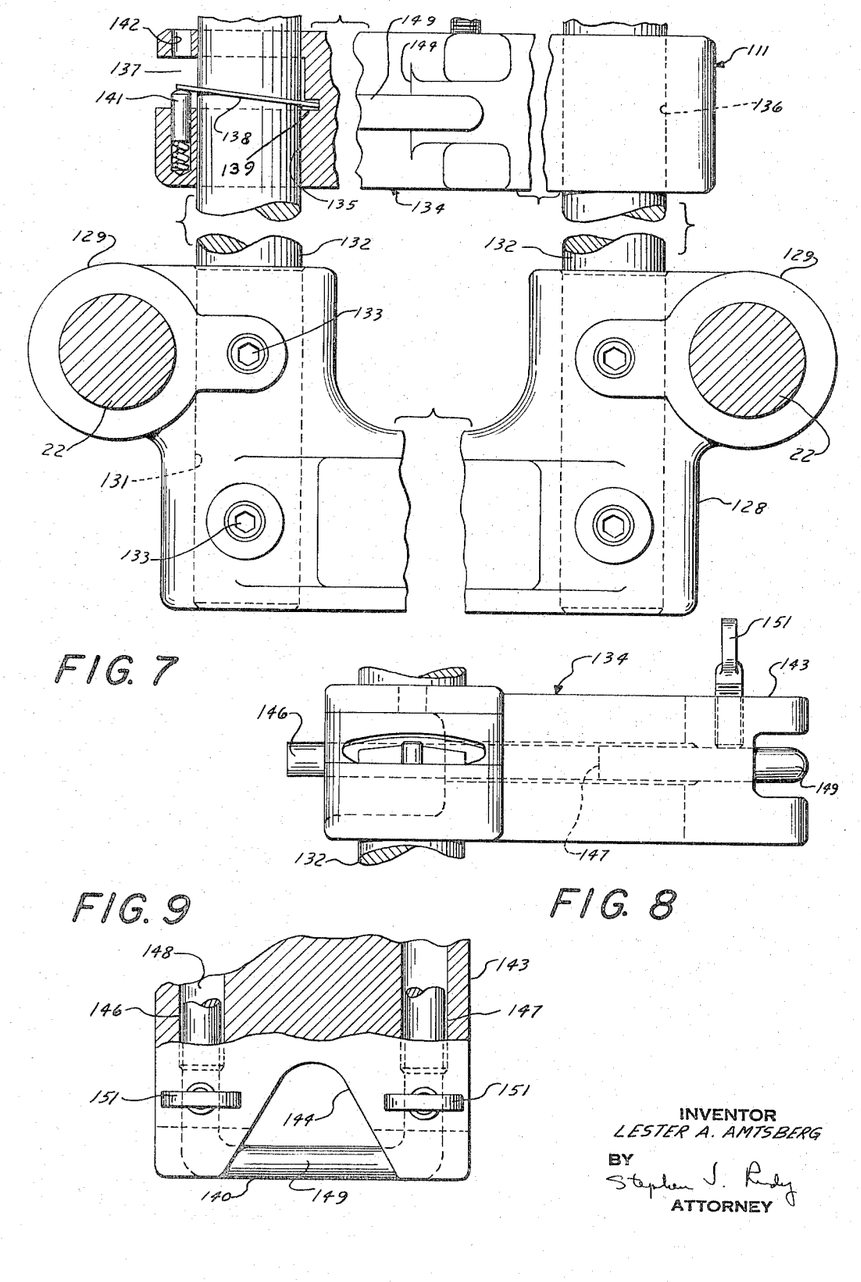
FIG. 7 is a view in end elevation, with portions broken away for convenience of illustration, of the handle clamp member of the tool holding means.
FIG. 8 is a side elevational view of the handle clamp plate shown at the upper part of FIG. 7.
FIG. 9 is a fragmentary detail in plan of a portion of the handle clamp plate.
Figure 10:
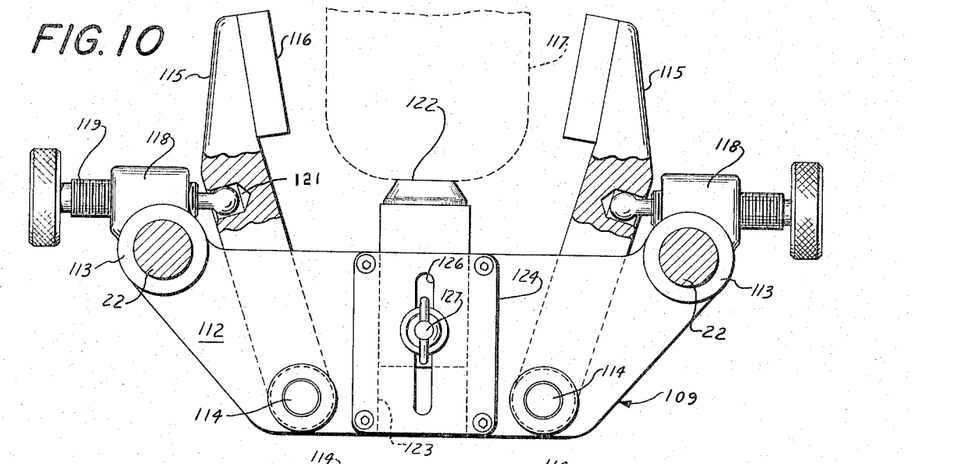
FIG. 10 is an end elevational view of the body clamp member of the tool holding means.
Figure 11:
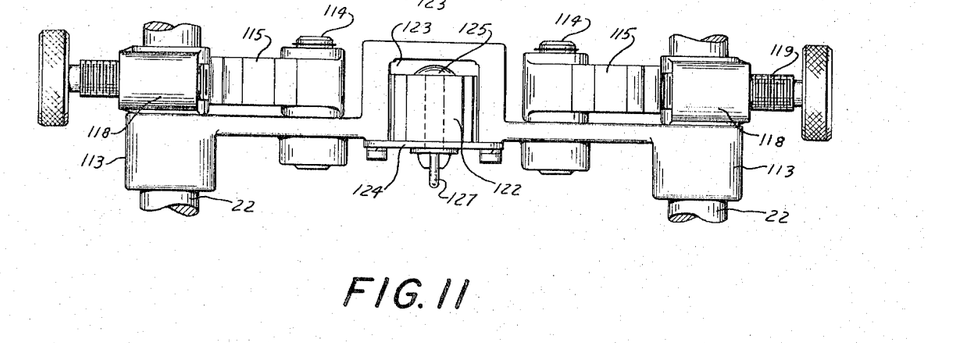
FIG. 11 is a top plan of FIG. 10.

The delivery of torque from the tool to the dynamometer is accompanied by an equal torque reaction transferred to the housing of the tool. To make certain that the tool will be rigidly held in position to resist this reaction, and will be centered relative to the dynamometer during the testing operation, the tool holding means 15 (FIGS. 1 and 7–11) is utilized. This means includes a body clamp 109 (FIGS. 10, 11), and a handle clamp 111 (FIGS. 7–9). The body clamp serves to center and fix the body of the tool relative to the dynamometer. It includes a plate member 112 which is adapted to extend below and transversely of the bed rods 22. A pair of parallel elongated sleeves 113 is formed at the upper ends of the clamp plate 112. Each sleeve is adapted to slidably sleeve one of the bed rods. Extending axially and in parallel spaced relation from the lower end of the clamp plate is a pair of pivot pins 114 upon each of which the lower end of a clamp arm 115 is pivoted. The clamp arms are adapted to pivot toward and away from each other so as to engage between pads 116 at their upper ends opposite sides of the body 117 of the tool. A pair of opposed transversely extending internally threaded nut members 118 is formed at the upper ends of the clamp plate 112. Threadable through each nut member is a clamp screw 119, the inner end of which has a ball and socket connection 121 with a separate one of the clamp arms. Each clamp screw may be manually threaded inwardly or outwardly as required to pivot the corresponding clamping arm into clamping condition or to draw it to released condition relative to the tool. The clamp screws are threaded relative to the tool as needed to center the latter relative to the dynamometer. The body clamp includes further means for supporting and leveling the tool between the clamp arms so that the output spindle 63 of the tool will be axially aligned with the input spindle 61 of the dynamometer. This means includes a leveling block 122 which is vertically slidable upwardly above the clamp plate 112 and is guided in this movement by means of a channel formation 123 centrally of the clamp plate. The channel 123 has an open side over which a cover plate 124 is bolted. An axially extending screw 125 projects from the block 122 through a vertical guide slot 126 in the cover plate. A wing nut 127 on the screw is cooperable with the face of the cover plate to releasably lock the block in a selected elevated position. In the use of the body clamp 109, after the tool 16 has been coupled to the input spindle of the dynamometer, the body clamp plate 112 is slid by means of its sleeve portions 113 along the rods 22 to position the clamp arm 115 at opposite sides of the main body portion 117 of the tool. The block 122 is then adjustably elevated against the underside of the body of the tool to level the latter. The wing nut 127 is then tightened. Finally, the clamp arms 115 are drawn tightly by means of the screws against opposite faces of the tool to the extent required to center and fix the position of the tool in axial alignment with the input spindle of the dynamometer.

Figure 1:
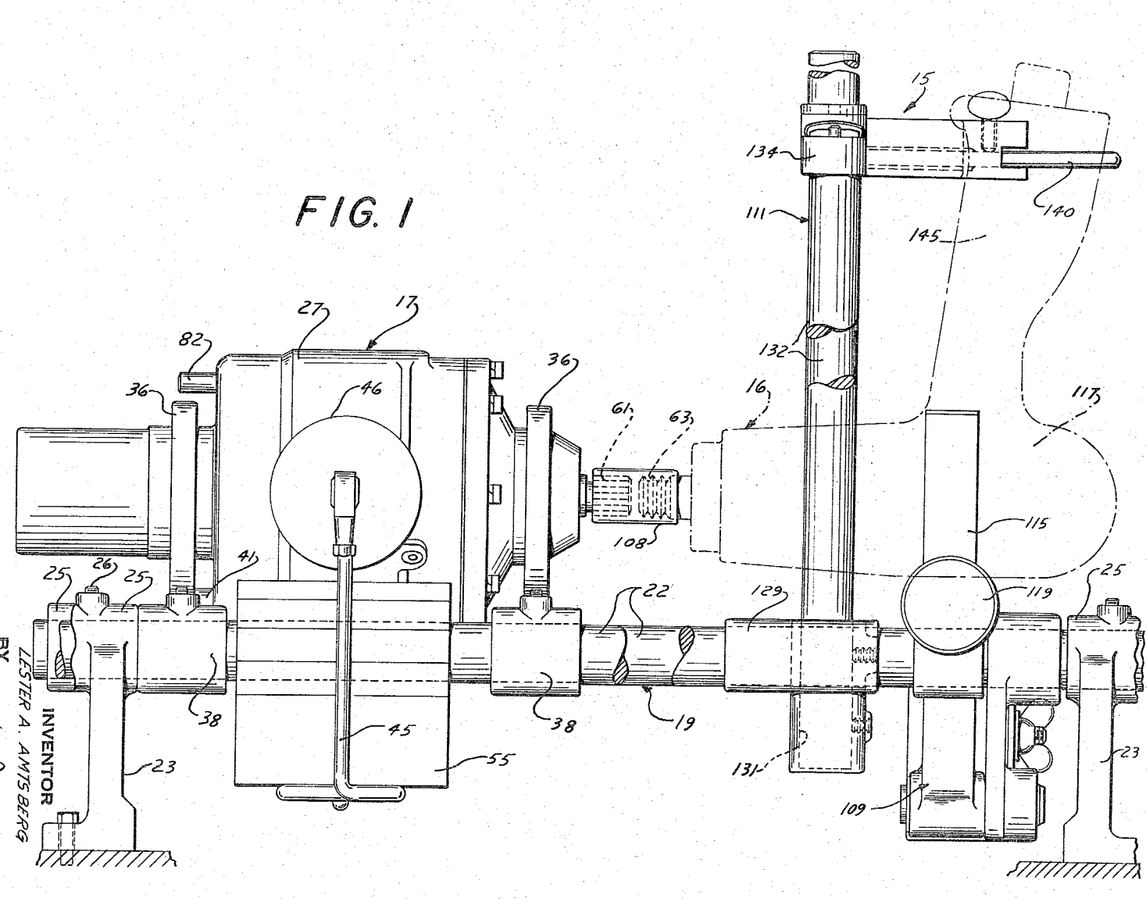
FIG. 1 is a side elevational view of a rotary tool torque delivery testing apparatus illustrating the invention.
Figure 2:
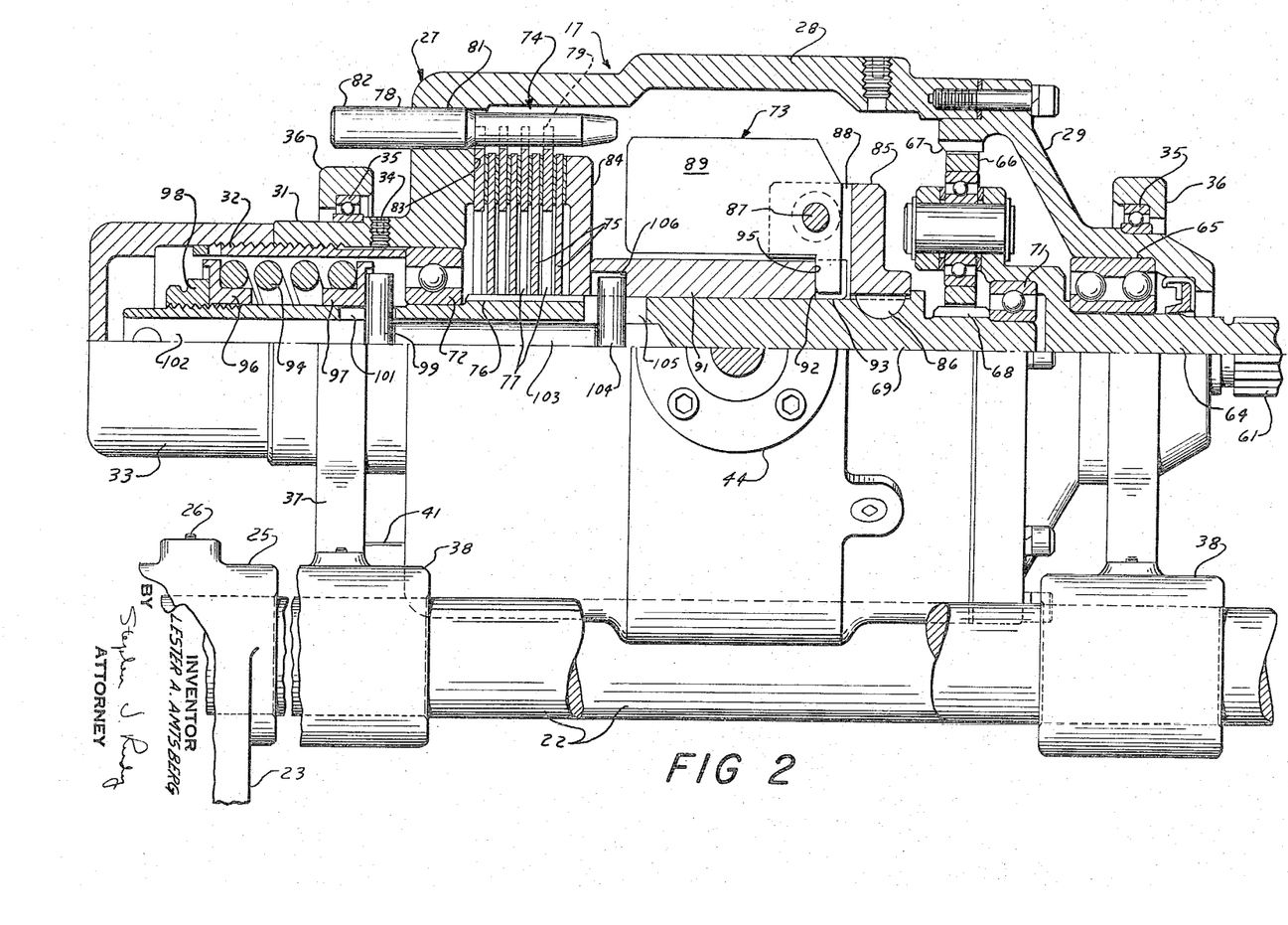
FIG. 2 is a side elevational view of the dynamometer member of the apparatus, wherein the upper half only is shown in longitudinal section for convenience of illustration inasmuch as a similar section of the lower half would be the same.

To further insure the tool against movement, the handle holding clamp 111 is utilized (FIGS. 1 and 7–9). This includes a supporting base plate 128 adapted to extend below and transversely of the underside of the bed rods 22. Each of a pair of parallel elongated sleeve portions 129 formed at the upper ends of the base plate is adapted to slidably sleeve one of the bed rods. Adjoining each sleeve 129 is a vertical socket 131 in which is slidably fitted a post 132. Setscrews 133 serve to lock each post in its socket. The posts extend vertically and in parallel opposed relation. Adjustably slidable up and down the posts is a clamp plate 134 lying in a horizontal plane. This plate includes at opposite ends a pair of bores 135, 136 in each of which one of the posts is slidably received. One end of the plate has a transverse slot 137 communicating with the bore 135 and adapted to accommodate an annular flat spring 138. The spring encircles the post and is anchored at a portion of its periphery in a groove 139 formed rearwardly of the bore. A spring loaded pin 141 projects upwardly from a lower wall of the slot 137 and presses upwardly against the underside of the spring at a point diametrically opposite to the portion of the spring anchored in the groove 139. This pin serves to frictionally engage the spring with the post and thereby frictionally secure the clamp plate 134 to the post. The clamp plate may be adjustably raised or lowered to any selected position along the posts. To make this adjustment, the operator may insert a finger in the slot 137 to depress the spring against the resistance of the spring loaded pin 141, or may insert a probe downwardly through the hole 142 to depress the spring. While holding the spring in relaxed condition, the operator may slidably adjust the position of the clamp plate 134 along the posts. A reduced central portion 143 of the clamp plate extends rearwardly of the posts 132. It is provided with a V-notch 144 in which the upwardly extending handle 145 of the tool is adapted to be received (FIG. 1). In applying the handle clamp 111 to the tool, after the clamp plate 134 has been adjusted to a proper level to receive the handle therein, the position of the base plate 128 is adjusted along the bed rods 22 until the sides of the V-notch 144 engage about the handle of the tool. Finally, the arms 146, 147 of a U-member 140 are passed about the handle of the tool and inserted into complementary holes 148 in the clamp plate until the bridge 149 of the U-member tightly collars the handle. A pair of wingscrews 151 are then threaded into the clamp plate against the arms of the U-member to lock the position of the latter.

Figure 5:
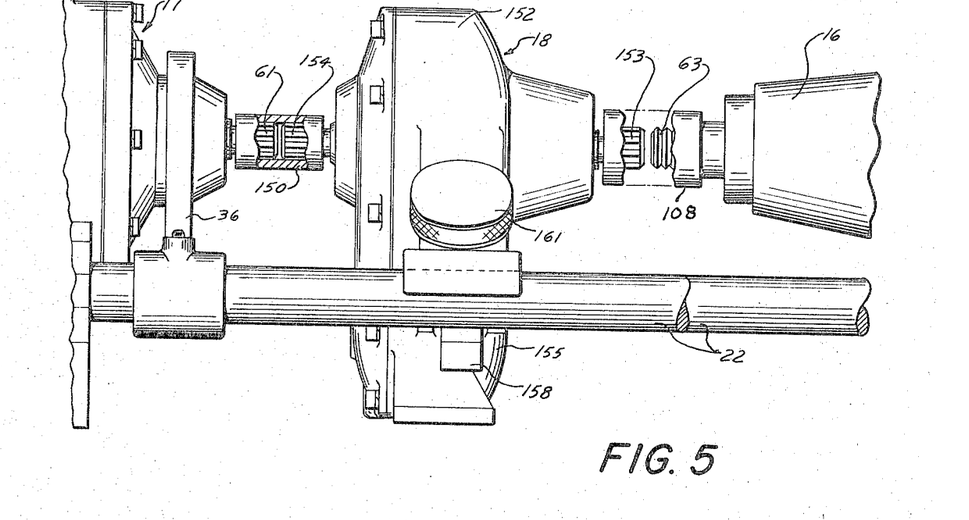
FIG. 5 is a side elevational view of a selected gear box in coupled relation to the spindles respectively of the dynamometer and a rotary tool being tested.

The fixed test speed selected for the dynamometer is preferably one which permits testing of a large number of air tools which at the selected speed have a torque output within the range capacity of the dynamometer and thus may be coupled directly to the dynamometer. Although the dynamometer has a fixed test speed at its input spindle, it may nevertheless be utilized for testing tools at other selected speeds, which are either lower or higher than the fixed speed of the dynamometer. This might be done particularly with some tools which if coupled directly to the dynamometer, would have torque outputs outside of the range capacity of the dynamometer. To enable this use of the dynamometer, speed changing mechanism 18 in the form of gear boxes, one being shown at 152 in FIG. 5, is employed to provide a different test speed for such tools proportioned to the selected test speed of the dynamometer. To provide a plurality of selectable speeds, a group of selectable gear boxes is utilized, each having a specific gear ratio. This enables various tools to be tested at a selected speed suited to the torque and power of the particular tool. The function of the gear box is to reduce the speed of the tool to a selected test speed at the input end of the gear box having a ratio to the speed at the output end of the gear box which will bring the torque output of the tool within the range capacity of the dynamometer. For example, a gear box, having a 2:1 gear ratio and providing a test speed of 200 r.p.m. at its input end 153 when its output spindle 154 is coupled to the dynamometer, may be used for testing tools having at that speed a torque output from 4–24 lbs.-ft.; and a gear box having a 1:2 gear ratio and providing a test speed of 800 r.p.m. at its input end when its output spindle is coupled to the dynamometer, may be used for testing tools having at that speed a torque output from 1 to 6 lbs.-ft.

As an example of the use of the dynomometer with a gear box in testing the torque delivery of a rotary air tool, let it be assumed that a used rotary air tool known at the time of its manufacture as capable of delivering torque of 24 lbs.-ft. at a speed of 200 r.p.m. is to be tested. A gear box having a 2:1 ratio is then selected to drivingly couple the output spindle 63 of the tool to the input spindle 61 of the dynamometer by means of suitable adapters 150 and 108. This will provide a reduced speed of 200 r.p.m. at the input end of the gear box. Next, a weight load of 12 lbs.-ft., corresponding according to the 2:1 ratio to the 24 lbs.-ft. it is estimated will be delivered at the input end 153 of the gear box is added to the load arm. This will cause the dynamometer housing to pivot clockwise (FIG. 4) until the stop pin 41 (FIG. 4) limits against the wall 58 of the slot 42. The tool is then pneumatically operated. The action that takes place follows the example earlier given in the use of the dynamometer without the gear box. In this case, when a balanced condition of the input torque to the gear box is reached relative to the counter torque being applied by the load arm to the dynamometer, a reading of the weight load on the load arm should be multiplied by the numerator of the ratio of the gear box used. The product will indicate the delivered torque output of the tool at the input end of the gear box. In the case of a gear box having an inverse ratio, for example 1:2, the balancing weight load reading on the load arm should be divided by the denominator of the ratio of the gear box. The result will indicate the delivered torque output of the tool at the input end of the gear box.

To facilitate the use of the apparatus, the manufacturer may include with it a test data chart such as that shown below:

TEST DATA CHART

| Col. A | Col. B | | Col. C | Col. D | Col. E |
|---|---|---|---|---|---|
| Tool No. | Gear Box | | Load Arm (Weight) | Torque Del'd | R.p.m. |
| | Code | Multiplier | | | |
| (*) | (*) | | (*) | | |
| CP-301 | G | ⅛ | 2.4 | .3 | 3,200 |
| CP-302 | G | ⅛ | 5.6 | .7 | 3,200 |
| CP-306 | F | ¼ | 7.2 | 1.8 | 1,600 |
| CP-310 | E | ½ | 7.4 | 3.7 | 800 |
| CP-314 | D | 1 | 7.6 | 7.6 | 400 |
| CP-319 | D | 1 | 11.8 | 11.8 | 400 |
| CP-324 | C | 2 | 10.2 | 20.4 | 200 |
| CP-327 | B | 4 | 9.2 | 36.8 | 100 |
| CP-332 | A | 8 | 7.1 | 56.8 | 50 |
| CP-349 | A | 8 | 12.0 | 96.0 | 50 |

NOTE.—The purpose of the above chart is to illustrate the complete functional details of the applicant's device. In actual use, the operator of the device needs only the data in the columns headed by an asterisk (*). He will also be given data on air pressure and air consumption, the measurement of which is not a part of this application.

This chart may be made up for use in testing all the tools of a particular manufacturer, or for testing tools of various manufacturers. It will have a group of columns in one of which, designated as Col. A, will be listed the names of tools that may be tested. In a second column, designated as Col. B, will be listed a code letter identifying for each tool listed a particular gear box be used in coupling that tool to the dynamometer and the multiplier applicable to that gear box; or if no gear box is to be used a code letter, such as the letter D, will appear indicating the tool is to be coupled directly to the dynamometer. In a third column, designated as Col. C, will be indicated the lbs.-ft. weight that is to be added to the load arm at the start of the testing operation. In another column, designated as Col. D, will appear what the torque delivery of the tool should be according to the manufacturer's original performance chart when tested at the particular speed provided by a particular gear box. A Col. E may be added to indicate the speed of the tool.

The apparatus may be provided in the form of a kit which will comprise a supporting bed rail means 19; a dynamometer 17 having a fixed test speed; a group of gear boxes 152, each providing a different test speed at its input end when its output end is coupled to the dynamometer; a test data chart, as earlier mentioned, to guide the operator in using the apparatus; and a supply of adapters 108, 150 for coupling, as required, the tool either directly, or indirectly through a gear box to the dynamometer.

The quantity of gear boxes provided would be sufficient to enable the operator to test either the entire line of tools of a particular manufacturer or most conventional tools on the market.

Figure 6:
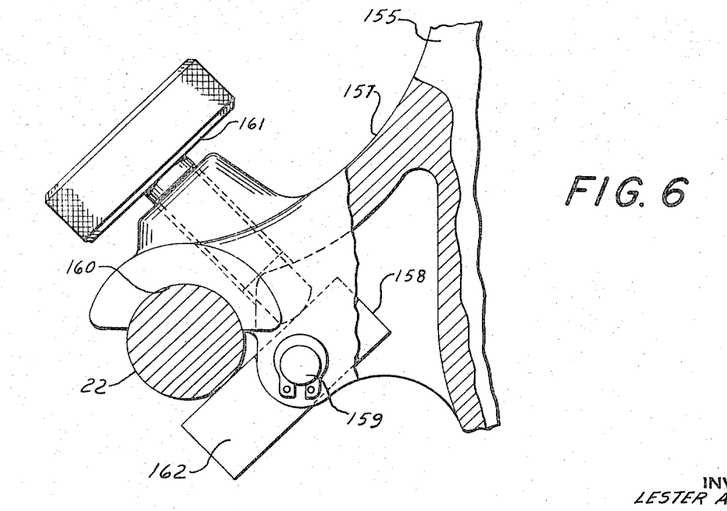
FIG. 6 is a detail of one of a pair of similar side arms of a gear box for releasably clamping it to the supporting rail bed of the apparatus.

The housings 155 of the several gear boxes are similar, accordingly, only one is shown in the drawings (FIGS. 5, 6) for purposes of illustration. The gearing arrangement, not shown, within the housing to provide the required gear ratio is conventional. Each gear box has a pair of externally splined spindles 153, 154 projecting through opposite ends of the housing. Either of these spindles may selectively serve as an output or input spindle. Each gear box is releasably clampable to and slidable along the bed rods 22 between the tool and the dynamometer. For this purpose the gear box is symmetrical, having a pair of oppositely extending arms 157, one being shown in FIG. 6. Each arm has an arcuate undersurface 160 as its outer end which conforms to and is adapted to seat upon a corresponding upper surface of one of the rods 22. This construction enables the gear box to be slid along the rods to a desired position between the dynamometer and tool for coupling of its spindles to the dynamometer and the tool. A clamp is associated with each arm of the housing. This clamp includes a clamp block 158 pivoted upon a pin 159 supported in the housing 155. The block is pivoted a little above its center on the pin so that in a fully relaxed condition it assumes a vertical position. A screw member 161 manually threadable in the arm of the gear box housing is movable against the upper end of the clamp block to pivot the latter downwardly and cause the lower end 162 of the clamp block to move upwardly into clamping relation with the underside of the related bed rod. Tightening of the screws 161 serves to clamp the gear box housing fast to the rods.

Each of the gear boxes is invertible so that either of its spindles may be utilized as an input spindle. This is of decided advantage in that it serves to reduce the number of gear boxes required to be included with the apparatus or kit. To this end, the gearing in each gear box is so arranged that the external spindles thereof are axially aligned and will be axially aligned with the dynamometer spindle when the gear box is mounted on the bed rods, as appears in FIG. 5. By this construction, each gear box also serves to provide gearing having a pair of effective gear ratios which may be selectively used accordingly as one spindle or the other of the gear box is coupled to the dynamometer. The identical clamping structure at opposite ends of the gear box housing enables the gear box to be selectively inverted on the bed rods, as desired, to couple one or the other of its spindles with the dynamometer.

Each gear box has a pair of separate letters, not shown, of the alphabet, one of which is located on one side of the housing near one spindle end, and the other of which is located on the other side of the housing near the other spindle end. Each letter indicates a specific effective gear ratio. When the gear box is coupled to the dynamometer, one of the letters will face the operator who will stand at a selected side of the dynamometer. The letter facing the operator will indicate to him the effective gear ratio being used. The letters on the gear box correspond to the code letters set forth in the test data chart. It is obvious, that some letters, for example, the letters A and G represent a single gear box having one effective gear ratio when one spindle is coupled to the dynamometer; and having another effective gear ratio when the other spindle is coupled to the dynamometer. Similarly, the letters B and F represent another gear box; and the letters C and E represent a further gear box. The letter D in the test data chart corresponds to a letter appearing on the dynamometer at its spindle end, meaning that no gear box is to be used and that the tool is to be coupled directly to the dynamometer.

While an embodiment of the invention has been illustrated and described in detail, it is to be expressly understood that the invention is not limited thereto. Various changes can be made in the design and arrangement of the parts without departing from the spirit and scope of the invention; and it is my intent, therefore, to claim the invention not only as shown and described herein, but also in all such forms and modifications as may reasonably be construed to fall within the spirit of the invention and the scope of the appended claims.

What is claimed is:

1. A kit for testing at various selectable speeds the torque delivery of rotary tools, comprising a torque indicating dynamometer having an input spindle and speed control means connected to the input spindle automatically operable during rotation of the input spindle to fix the maximum speed of the latter; a group of invertible gear boxes each having a pair of spindles projecting from opposite ends of the box in axial alignment, either spindle being selectively employable as an input or an output spindle, and each gear box having between its spindles a gear ratio different from the other gear boxes; adapter elements for selectively coupling the selected input spindle of the dynamometer to the output spindle of a rotary tool, or for coupling the input spindle of the dynamometer to the selected output spindle of a selected gear box and for coupling the selected input spindle of the selected gear box to the output spindle of a rotary tool; and a common standard for supporting the dynamometer, any selected one of the gear boxes and the rotary tool in axial alignment, the gear boxes and dynamometer having at all times when mounted to the standard a fixed spaced elevated relation of their spindles to the standard, and means mountable to the standard for supporting the rotary tool to the standard and for adjusting the elevated relation of the rotary tool to the standard so as to bring the spindle of the rotary tool in axial alignment with the spindles of the selected gear box and dynamometer.

2. A dynamometer for testing the torque output of a rotary tool at a predetermined speed, comprising a pair of bearing supports, a housing supported in the bearing supports for limited angular rotation, a torque input spindle supported in the housing for relative rotation adapted to be drivingly coupled to the output spindle of a rotary tool, slip clutch means, speed control means within the housing having cooperation with the slip clutch means for transmitting to the housing the torque of a rotary tool that may be drivingly coupled to the input spindle and for holding the speed of the input spindle and as a consequence the speed of any rotary tool to a predetermined maximum, and means for applying a calculable selected torque force to the housing sufficient to counterbalance the torque that may be applied to the input spindle by the rotary tool.

3. A dynamometer as in claim 2, wherein a pin carried by the housing is cooperable with opposed walls of a slot formed in one of the bearing supports to limit the extent of angular rotation of the housing.

4. A dynamometer for testing the torque output of a rotary tool at a predetermined speed, comprising bearing support means, a housing supported in the latter means for limited angular rotation, a torque input spindle supported in the housing for relative rotation adapted to be drivingly coupled to the output spindle of a rotary tool, a brake shaft supported axially of the housing for relative rotation, means drivingly coupling the input spindle with the brake shaft, a slip clutch brake having driven clutch means carried by the housing and driving clutch means carried by the brake shaft normally disengaged from the driven means, the driving clutch means adapted under pressure to become frictionally engaged with the driven clutch means so as to transmit the torque of the input spindle to the housing, a centrifugal speed control governor means carried by the brake shaft controlling engagement of the driving and driven clutch means adapted upon acceleration of the brake shaft to a predetermined speed to pressure the driving clutch means into frictional engagement with the driven clutch means, and means for applying a calculable selected torque force to the housing sufficient to counterbalance the torque being applied to the input spindle.

5. A dynamometer as in claim 4, including spring means yieldably resisting the action of the governor means to pressure the driving clutch means.

6. A dynamometer as in claim 5, wherein manipulative means is provided for adjusting the tension of the spring means, and wherein the housing includes a removably mounted cap allowing access to the manipulative means.

7. A dynamometer as in claim 4, wherein the means drivingly coupling the input spindle with the brake shaft comprises an internal gear of the housing, a spur gear on the brake shaft and planetary idler gears carried by the spindle meshed between the internal gear and the spur gear.

8. A dynamometer as in claim 4, wherein the means for applying a calculable selected torque force to the housing comprises a weight loadable arm extending radially from a side of the housing.

9. A dynamometer as in claim 4, wherein the driven clutch means comprises a group of brake discs slidably splined to the housing, and the driving clutch means comprises a groups of friction discs slidably splined to the brake shaft and interleaving the brake discs.

10. A dynamometer as in claim 9, wherein each of the brake discs has a pair of opposed notches in its periphery, and a separate pin supported in the housing extends with a slide fit through one of the notches of each of the brake discs.

11. A dynamometer as in claim 10, wherein one of the pins projects externally of the housing into a slot formed in the bearing support means and cooperates with the opposed walls of the slot to limit the extent of angular rotation of the housing.

12. A dynamometer as in claim 9, wherein the several brake and friction discs are arranged for slidable movement into compressive engagement with one another between a rigid wall of the housing and a slidable pressure plate, a sleeve on the brake shaft is slidable between the pressure plate and the governor, and the governor carries centrifugally pivotable flyweights adapted to move the sleeve into compressive engagement with the pressure plate.

13. The combination comprising a dynamometer having an axially extending input spindle, speed changing gear box means having an output spindle projecting from one end and an input spindle projecting from the opposite end, means drivingly coupling the output spindle of the gear box with the input spindle of the dynamometer, the input spindle of the grear box adapted to be drivingly coupled to the output spindle of a rotary tool, and the dynamometer having speed control means drivingly connected to its input spindle automatically operable during the rotation of its input spindle to fix the maximum speed of the latter, whereby a different maximum speed is produced according to the gear ratio of the gear box at the input spindle of the latter and as a consequence for any tool that may be drivingly coupled to the input spindle of the gear box.

14. The combination as in claim 13, wherein holding means is provided for rigidly holding any tool that may be coupled to the gear box in such manner that the output spindle of the tool is axially aligned with the input spindle of the gear box.

15. The combination as in claim 14, wherein rail bed means serves as a common support for the dynamometer, the gear box and the holding means, and wherein the dynamometer, gear box and holding means are each provided with means for slidably adjusting their positions on the rail bed means relative to one another.

16. The combination as in claim 15, wherein the input and output spindles of the gear box are axially aligned, and the gear box is invertible on the rail bed means for selectively coupling either of its spindles with the input spindle of the dynamometer.

References Cited by the Examiner

UNITED STATES PATENTS

| 854,720 | 5/1907 | Dawson | 73—135 X |
|---|---|---|---|
| 1,141,802 | 6/1915 | Johnson | 73—135 X |
| 1,249,261 | 12/1917 | Walker | 73—134 |
| 1,445,923 | 2/1923 | Wilder | 73—118 |
| 2,004,950 | 6/1935 | Jenkins | 73—135 |
| 2,199,955 | 5/1940 | Kruck | 73—141 X |
| 3,075,381 | 1/1963 | Lelis | 73—118 |
| 3,138,018 | 6/1964 | Pohl | 73—116 |

FOREIGN PATENTS 288,427  4/1928  Great Britain.

JAMES J. GILL, *Acting Primary Examiner.*

RICHARD C. QUEISSER, *Examiner.*

C. A. RUEHL, *Assistant Examiner.*